Sept. 20, 1960    B. VOLMER    2,953,018
FATIGUE TESTING MACHINE FOR AUTOMOBILE WHEELS
Filed Oct. 22, 1958
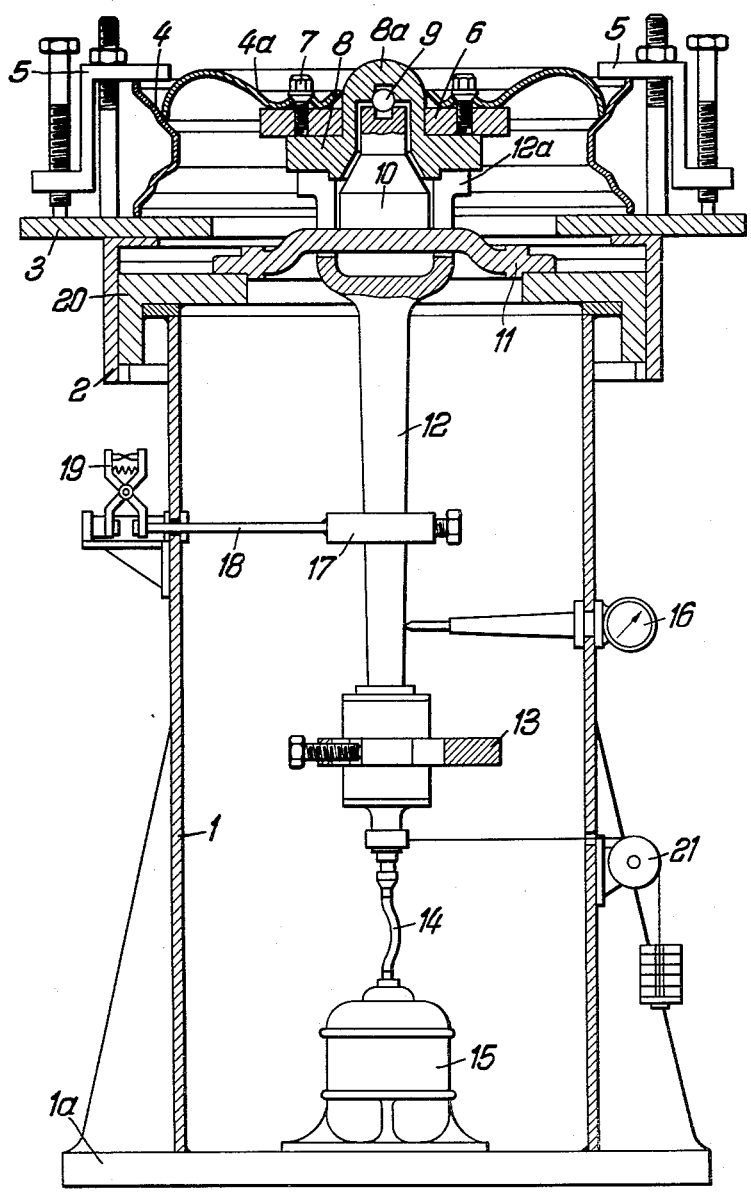
Inventor
Bodo Volmer
By his attorneys
Howson and Howson

United States Patent Office 2,953,018
Patented Sept. 20, 1960

---

2,953,018

FATIGUE TESTING MACHINE FOR AUTOMOBILE WHEELS

Bodo Volmer, Hilden, Rhineland, Germany, assignor to Kronprinz Aktiengesellschaft, Solingen-Ohligs, Germany, a German company Filed Oct. 22, 1958, Ser. No. 768,939

1 Claim. (Cl. 73—91)

This invention concerns a machine for testing the fatigue limit of vehicle wheels and particularly ones having pneumatic tires mounted on disk wheels.

Fatigue testing machines have heretofore been known for determining the endurance of wheels of power driven vehicles against reciprocatory stresses in which the wheel to be tested is held at its circumference by means of clamps on its rim. Against a vertical rotating disk held against the hub of the vehicle there is fastened a lever arm on the free end of which a testing load is mounted. By the use of this testing load a bending moment is created on the disk of the wheel which bending moment rotates when the vertically rotating disk is caused to turn. This serves to initiate the load which would be exerted on the wheel when the vehicle is started up and also when the vehicle is turning around curves.

While this machine has found wide acceptance, it has the disadvantage that the wheel to be tested is rotating during the test. It is therefore impossible to observe when a crack in the wheel begins. This is a disadvantage because it is important to ascertain when and where the first crack starts.

It is the object of the present invention to avoid this disadvantage by providing stationary clamping means for the wheel to be tested and by providing means carrying out a rotary motion and serving for the generation of the transverse force at the load lever for effecting a continuous change of the direction of the transverse force. As means for generating the transverse force on the load lever, an eccentric weight is preferably applied being pivoted on the load lever, which can be radially adjustable and being driven by an electric motor.

Another object of the present invention is to enable to check the deformation of the vehicle wheel occurring during the testing operation, therefore, means for measuring the load lever deflections effected by the transverse force has been provided in accordance with the invention. The values for the deflections of the load lever indicated by this measuring device represent a measure for the bending moment occurring on the vehicle wheel to be tested. In order to be able to determine the absolute value of the respective bending moment, it is necessary to know the relationship of the load lever deflection to the transverse force. For this reason I provide at the load lever means for generating a measurable and variable transverse force at a predetermined load limit which, together with the means measuring the deflections of the load lever, allow calibration of the machine.

It is another object of this invention to avoid an excessive stress of the specimens. Therefore, it is necessary to keep the load lever deflections generated by the eccentric weight within certain limits. For this purpose, a switch means being influenced by the load lever had been provided in accordance with the invention stopping the drive of the eccentric weight in the event of transgression of a certain definite load lever deflection.

In this novel machine a rotary motion of the specimen and the load lever is no longer taking place. Therefore it is without further ado possible to arrange the portions in such a manner that the load lever of the vehicle wheel being clamped in horizontal position is extending vertically in downward direction. Therefrom results a particular simple, space saving and neat grouping of the machine design and the advantage that the specimen can be easily observed. In a preferably applied embodiment of the machine a bonnet-like head is connected with the upper forked end engaging and centering in a flange rigidly connected with the wheel disk. The head rests by means of a ball serving as hemispherical bearing support on a supporting member concentrically arranged to the vehicle wheel, which supporting member is for its part carried by a fixed abutment passing transversely through the forked end of the load lever end with an appropriate clearance.

An embodiment exemplifying the testing machine in accordance with the invention has been illustrated by a vertical section in the enclosed drawing.

In the drawing the machine has a hollow cylindrical housing 1 with a base 1a. On its upper end there is a supporting angle ring 2 carrying a horizontal plate 3 upon which the vehicle wheel to be tested is clamped tightly in horizontal position by Z-shaped shims 5 on the plate. An annular hub flange 6 is rigidly connected with the wheel disk 4a by means of wheel nuts 7. A bonnet-like head 8 is engaging and centering within the orifice of the hub flange, which head is united to the upper forked end 12a of the load lever 12 extending vertically downward. The portion 8a of the head 8 projecting through the orifice of the hub flange 6 includes a ball 9 arranged in the axle center of the vehicle wheel, by means of which ball the head 8 is resting upon a supporting member 10 being for its part carried e.g. by a cross-shaped abutment 11 projecting through the forked load lever end 12 with appropriate clearance. The latter being carried by the upper end of the machine frame by means of an angle ring 20.

On the lower end of the load lever 12 an eccentric weight 13 is pivoted and being driven by means of a flexible shaft 14 from an electric motor 15 attached on the base plate 1. The eccentric weight 13 is radially adjustable with regard to the load lever 12. The deflection effected by the load lever 12 is indicated by a measuring tool 16 cooperating together with the load lever. A shifter 19 provided at the machine column is connected with the load lever 12 through a ring 17 and a rod 18, aiming at stopping the motor 15 if the deflection of the load lever 12 is exceeding a certain definite measure.

In order to be able to find out the moments of the load of the wheel to be tested indicated by the measuring tool 16, an apparatus 21 has been provided by means of which a measurable transverse force can be given at which limit the eccentric weight becomes inoperative.

What I claim is this:

A machine for fatigue testing the wheels of power driven vehicles in which there are fixedly disposed clamping means adapted to be clamped to the rim of a flanged wheel, and a load arm at the hub extending in the direction of the wheel axle and an eccentric weight rotatably driven attached to the load arm adapted to give a rotating bending moment to the wheel, chracterized in that the load arm extends vertically downward and has a forked upper end, in combination with a bonnet-like head connected to the forked upper end of the load arm and concentrically meshing with a flange of the wheel, a ball bearing on which the head rests serving as a track, a support for the ball bearing concentrically disposed with relation to the vehicle wheel, and means fixedly carried on the machine carrying the support, the forked end of the load arm embracing said last-mentioned carrying means with clearance for deflection of the load arm.

References Cited in the file of this patent

UNITED STATES PATENTS

| | | |
|---|---|---|
| 2,328,908 | Kenyon | Sept. 7, 1943 |
| 2,554,212 | Quinlan | May 22, 1951 |
| 2,660,881 | Van Degrift | Dec. 1, 1953 |
| 2,748,597 | Kooistra | June 5, 1956 |